United States Patent
Hofmann et al.

(10) Patent No.: US 6,721,850 B2
(45) Date of Patent: Apr. 13, 2004

(54) METHOD OF CACHE REPLACEMENT FOR STREAMING MEDIA

(75) Inventors: Markus Hofmann, Fair Haven, NJ (US); Jayram Mudigonda, Austin, TX (US); Sanjoy Paul, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 480 days.

(21) Appl. No.: 09/794,379

(22) Filed: Feb. 27, 2001

(65) Prior Publication Data

US 2002/0120818 A1 Aug. 29, 2002

(51) Int. Cl.[7] .................... G06F 15/16; G06F 12/12
(52) U.S. Cl. .................... 711/133; 711/159; 709/226
(58) Field of Search .................... 711/133, 159; 709/226

(56) References Cited

U.S. PATENT DOCUMENTS

| | | | |
|---|---|---|---|
| 5,293,609 A | 3/1994 | Shih et al. | |
| 5,787,472 A | 7/1998 | Dan et al. | |
| 5,845,320 A | 12/1998 | Pawlowski | |
| 5,897,655 A | 4/1999 | Mallick | |
| 5,933,849 A | 8/1999 | Srbljic et al. | |
| 5,991,306 A | 11/1999 | Burns et al. | |
| 6,128,623 A | 10/2000 | Mattis et al. | |
| 6,330,605 B1 | * 12/2001 | Christensen et al. | ........ 709/226 |

\* cited by examiner

Primary Examiner—Jack A. Lane

(57) ABSTRACT

A system and method of cache replacement for streaming multimedia is provided. A network system includes a content provider connected to local service providers via an interactive distribution network, such as the Internet. The local service providers facilitate delivery of the content from the content provider to multiple subscribers. For each of the data blocks which make up the multimedia stream requested by a subscriber, the local service provider receiving the request determines whether the request can be serviced locally or whether the requested data blocks must be retrieved from the content provider. In the case where the portion of the requested stream must be retrieved from the content provider, the local service provider attempts to cache the requested blocks in its local cache in addition to streaming the data blocks to the requesting subscriber. The local service provider stores two lists to determine which cached block is to be replaced from the local cache memory in the case where the attempt to cache the requested blocks fail because the local cache memory is full. A first list defines those cached blocks for which there are no foreseeable future subscriber requests. The second list defines those cached blocks whose access time from existing suscribers is furthest in the future.

12 Claims, 15 Drawing Sheets

| ROW AND FIG | ROUND/ STREAM ARRIVALS | INTERVALS | SERVICE STREAM LIST | STREAM SERVICED | BLOCK RETURNED TO STREAM | CACHE CONTENTS (BLOCK 1 - BLOCK 2 - BLOCK 3) | VICTIM LIST | UNLOCKED BLOCK LIST |
|---|---|---|---|---|---|---|---|---|
| ROW 1 | STREAM S1 ARRIVES | - | - | - | - | EMPTY-EMPTY-EMPTY | - | - |
| ROW 2 FIG. 2a | START OF ROUND 1 | S1 - X | S1 | | | EMPTY-EMPTY-EMPTY | - | - |
| ROW 3 FIG. 2b | END OF ROUND 1 | S1 - X | | S1 | 202a | 202A-EMPTY-EMPTY | - | 202a |

CACHE MANAGEMENT TABLE

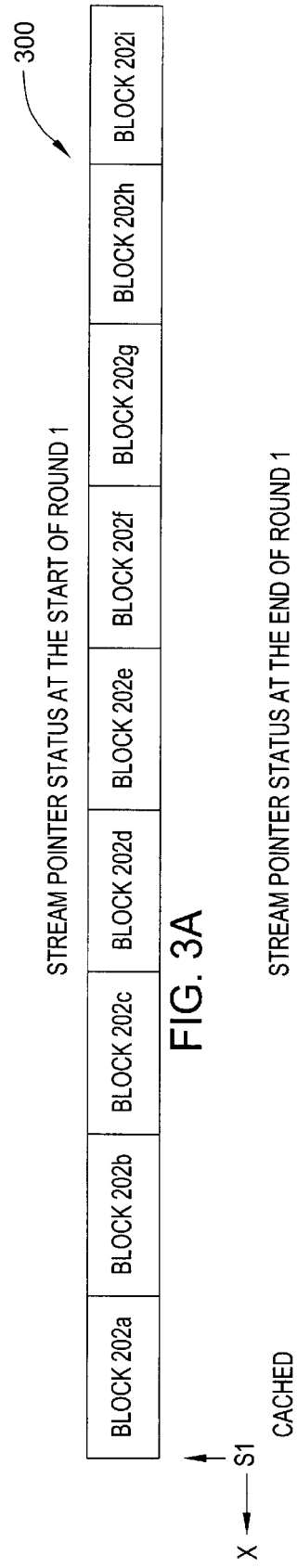

CACHE MANAGEMENT TABLE

| ROW AND FIG | ROUND/ STREAM ARRIVALS | INTERVALS S | SERVICE STREAM LIST | STREAM SERVICED d | BLOCK RETURNED TO STREAM | CACHE CONTENTS (BLOCK 1 - BLOCK 2 - BLOCK 3) | VICTIM LIST | UNLOCKED BLOCK LIST |
|---|---|---|---|---|---|---|---|---|
| ROW 4 | STREAM S2 ARRIVES | S1 - S2 | S1, S2 | - | - | 202a-EMPTY-EMPTY | 202a | - |
| ROW 5 FIG. 3a | START OF ROUND 2a | S1 - S2 | S1, S2 | - | - | 202a-EMPTY-EMPTY | 202a | - |
| ROW 6 FIG. 3b | END OF ROUND 2a | S1 - S2 | S2 | S1 | 202b | 202a-202b-EMPTY | 202b | - |
| ROW 7 FIG. 3b | START OF ROUND 2b | S1 - S2 | S2 | - | - | 202a-202b-EMPTY | 202a | - |
| ROW 8 FIG. 3c | END OF ROUND 2b | S1 - S2 | - | S1 | 202a | 202a-202b-EMPTY | 202b | 202a |

FIG. 4D

22 CACHE MANAGEMENT TABLE

| ROW AND FIG | ROUND/ STREAM ARRIVALS | INTERVALS | SERVICE STREAM LIST | STREAM SERVICED | BLOCK RETURNED TO STREAM | CACHE CONTENTS | VICTIM LIST (24) | UNLOCKED BLOCK LIST (26) |
|---|---|---|---|---|---|---|---|---|
| 9 FIG 4a | START OF ROUND 3a | S1 - S2 | S1, S2 | | | (BLOCK 1 - BLOCK 2 - BLOCK 3) 202a-202b-EMPTY | 202b | 202a |
| 10 FIG. 4b | END OF ROUND 3a | S1 - S2 | S2 | S1 | 202c | 202a-202b-202c | 202c | 202a |
| 11 FIG. 4b | START OF ROUND 3b | S1 - S2 | S2 | | | 202a-202b-202c | 202c | 202a |
| 12 FIG. 4c | END OF ROUND 3b | S1 - S2 | | S2 | 202b | 202a-202b-202c | 202c | 202a 202b |

FIG. 5C

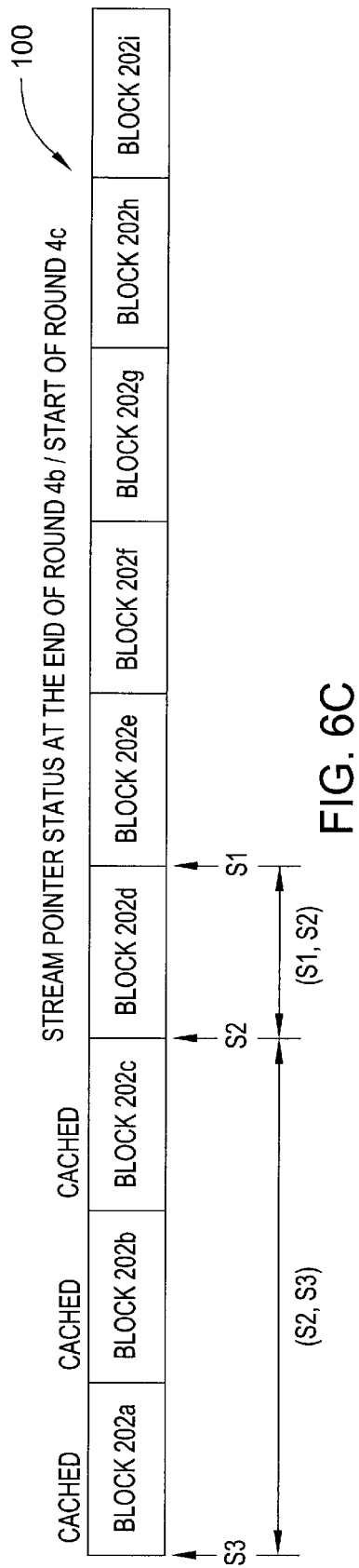
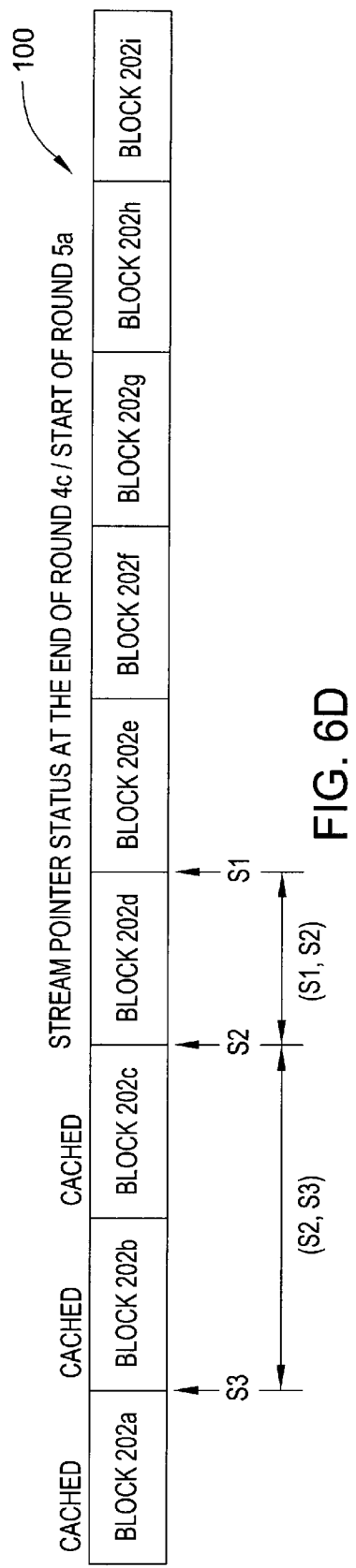

CACHE MANAGEMENT TABLE

| ROW AND FIG | ROUND/ STREAM ARRIVALS | INTERVALS | SERVICE STREAM LIST (22) | STREAM SERVICED | BLOCK RETURNED TO STREAM | CACHE CONTENTS (BLOCK 1 - BLOCK 2 - BLOCK 3) | VICTIM LIST (24) | UNLOCKED BLOCK LIST (26) |
|---|---|---|---|---|---|---|---|---|
| ROW 13 | STREAM S3 ARRIVES | S1 - S2<br>S2 - S3 | S1, S2, S3 | - | - | 202a-202d-202c | 202b | - |
| ROW 14 FIG. 5A | START OF ROUND 4a | S1 - S2<br>S2 - S3 | S1, S2, S3 | - | - | 202a-202d-202c | 202b | - |
| ROW 15 FIG. 5B | END OF ROUND 4a | S1 - S2<br>S2 - S3 | S2, S3 | S1 | 202d | 202a-202d-202c | 202d | - |
| ROW 16 FIG. 5B | START OF ROUND 4b | S1 - S2<br>S2 - S3 | S2, S3 | - | - | 202a-202d-202c | 202d | - |
| ROW 17 FIG. 5C | END OF ROUND 4b | S1 - S2<br>S2 - S3 | S3 | S2 | 202c | 202a-202d-202c | 202c | - |
| ROW 18 FIG. 5C | START OF ROUND 4c | S1 - S2<br>S2 - S3 | S3 | - | - | 202a-202d-202c | 202c | - |
| ROW 19 FIG. 5D | END OF ROUND 4c | S1 - S2<br>S2 - S3 | - | S3 | 202a | 202a-202d-202c | 202c | 202a |

FIG. 6E

CACHE MANAGEMENT TABLE

| ROW AND FIG | ROUND/ STREAM ARRIVALS | INTERVALS | SERVICE STREAM LIST | STREAM SERVICED | BLOCK RETURNED TO STREAM | CACHE CONTENTS (BLOCK 1 - BLOCK 2 - BLOCK 3) | VICTIM LIST | UNLOCKED LIST |
|---|---|---|---|---|---|---|---|---|
| ROW 20 FIG. 5d | START OF ROUND 5a | S1 - S2<br>S2 - S3 | | | | 202e-202d-202c | | |
| ROW 21 FIG. 6a | END OF ROUND 5a | S1 - S2<br>S2 - S3 | S3 | S1 | 202c | 202e-202d-202c | 202e<br>202c | |
| ROW 22 FIG. 6b | START OF ROUND 5b | S1 - S2<br>S2 - S3 | S2, S3 | | | 202e-202d-202c | | |
| ROW 23 FIG. 6c | END OF ROUND 5b | S1 - S2<br>S2 - S3 | S3 | S2 | 202d | 202e-202d-202c | 202d | 202a, 202b |
| ROW 24 FIG. 6c | START OF ROUND 5c | S1 - S2<br>S2 - S3 | S3 | | | 202e-202d-202c | | |
| ROW 25 FIG. 6d | END OF ROUND 5c | S1 - S2<br>S2 - S3 | | S3 | 202b | 202e-202b-202c | 202d | |

FIG. 7E

METHOD OF CACHE REPLACEMENT FOR STREAMING MEDIA

BACKGROUND OF THE INVENTION

1. Field of the Invention

The present invention relates generally to cache memories and methods for increasing the efficiency of cache memories, and more particularly, to a method of cache replacement for streaming media.

2. Description of the Related Art

Computer networks such as the Internet are increasingly being used to transmit multimedia data (e.g., audio and video data). The enormous increase in traffic from transmitting such data has severely strained the Internet infrastructure. This network congestion problem is only expected to grow in the future as new multimedia data and new media rich Internet services become widespread. Presently, data caching is a preferred solution to address the network congestion problem. Data caching attempts to move web content closer to the end-user and thus, minimize network and web server load, thereby improving the performance perceived by the end-user.

Data caching has been extensively implemented on the Internet to reduce network load (i.e., bandwidth consumption), server load, and high start-up latency. Existing data caching systems typically cache entire web documents, such as HTML documents and images, for example, and attempt to keep the documents and images consistent with the origin server. Current data caching systems are restrictive in that they only support static web objects, such as HTML documents or images. Static web objects are typically small and as such are always cached in their entirety. Current caching systems do not adequately support streaming multimedia data, such as video and audio streaming media objects. Streaming multimedia data, such as video objects, for example, are usually too large to be cached in their entirety. With the recent proliferation of audio/video content on web sites, it is imperative that data caching systems provide efficient support for streaming media. However, the present data caching systems treat multimedia (i.e., audio/video) clips as regular web objects thereby storing them in their entirety. Treating multimedia clips as regular web objects will prove to be adequate only in the short term as the size of multimedia clips on the web currently is relatively small. In the near future, however, faster Internet access technologies such as XDSL, DSL, VDSL and cable-modems will further enable the transmission of high-bandwidth, high resolution media clips that are much longer in duration than present day media clips. It will no longer be efficient and cost effective to cache such large media objects in their entirety.

The size of present day streaming media objects is typically at least an order of magnitude or two larger than that of a static web object, and therefore, do not lend themselves to be cached in their entirety. For example, a single, two hour long MPEG-2 movie requires about 4.5 GB of hard disk space. Given a fixed investment on buffer space, it is apparent that only a few media objects can be stored at a cache, and therefore, the hit ratio and the efficiency of the cache is limited. Given that caches have finite disk space, it is not feasible to statically store more than a few complete SM objects. If there are several simultaneous requests for different SM objects, the cache typically replaces one SM object with another, thus resulting in performance degradation.

Accordingly, a need exists for an improved cache block replacement method to provide improved cache performance. It is desirable to provide such improved cache block replacement method that is simple to implement and that takes advantage of the different service times required by multiple streams.

SUMMARY OF THE INVENTION

The present invention provides a method of cache replacement for multimedia streams. The cache replacement method of the present invention approximates full-knowledge of all future accesses by considering that future accesses for multimedia objects may be predicted with a high probability. This is based on the fact that in the majority of instances video accesses by clients are sequential, unlike data accesses in classical web caching.

In accordance with the method of the present invention, the cache replacement method operates in successive rounds. In each round, the method serves the streams in accordance with a service list order. Whenever it is determined that cache space must be made available to service a particular stream, an unlocked block list and a victim list are consulted to determine which cached block to release. The cache replacement method generally includes the steps of: in each round, receiving at least one client request for a media clip; constructing at least one service interval from the received client requests; constructing a service list from service intervals constructed in the present round and in previous rounds; and servicing client requests in an order

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, where:

FIG. 1b illustrates a snapshot in time of three requests for a representative media clip and which is stored at the origin server of FIG. 1a;

FIG. 1c illustrates the characteristics of three service intervals defined by the respective streams, S1, S2 and S3 of FIG. 1b;

FIGS. 3A–3C, 4A–4D, 5A–5C, 6A–6E and 7A–7E illustrate how the method of the present invention is implemented for a representative media clip requested by three requesting clients.

DETAILED DESCRIPTION OF THE PREFERRED EMBODIMENTS

Figure 1A:
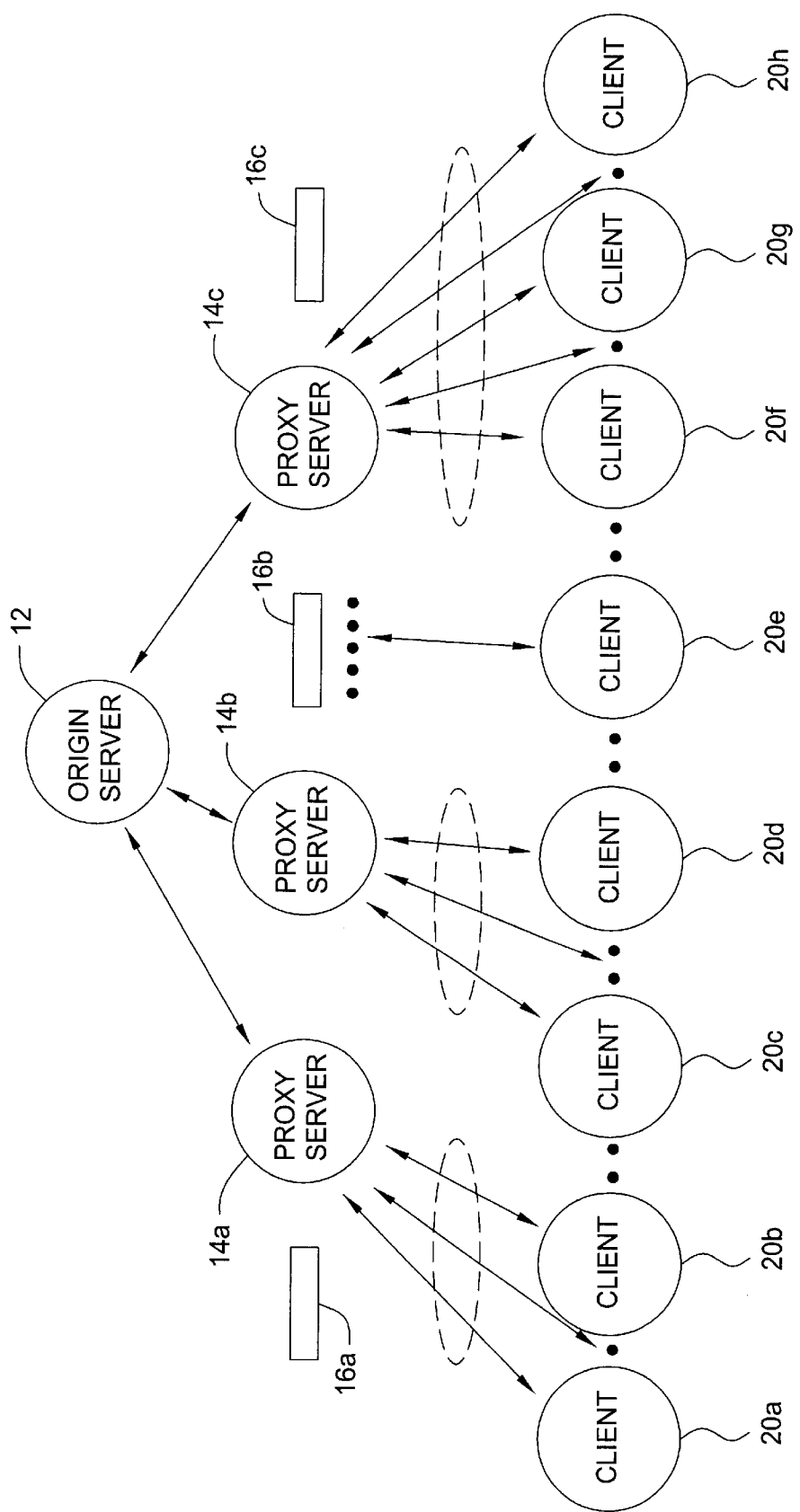
FIG. 1a is an illustration of network architecture in which the present invention is implemented.
Figures 1B, 1C:
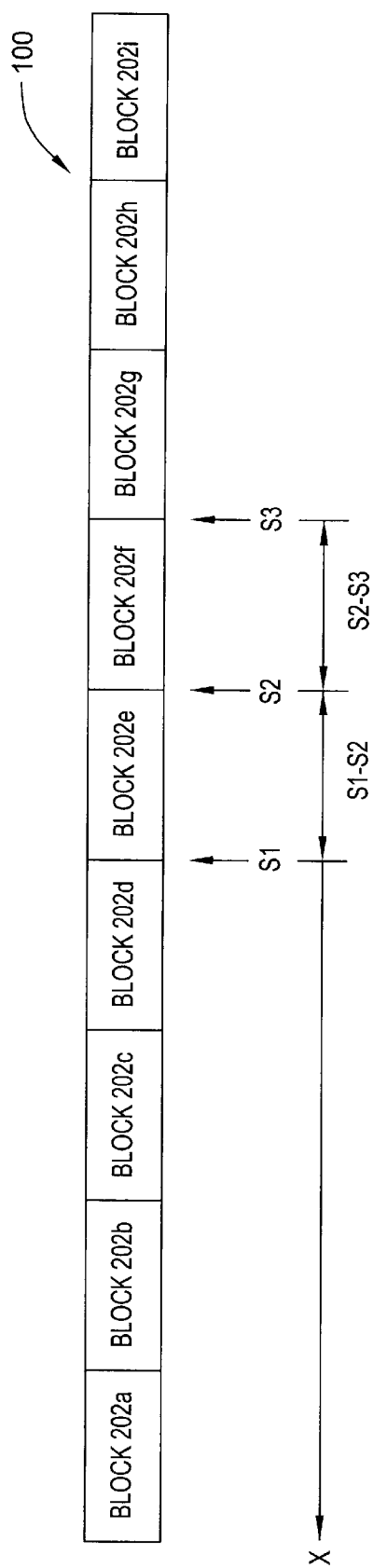

FIG. 1 is a block diagram of a network architecture in which the method of the present invention is implemented. An origin server 12 is connected to a plurality of proxy servers 14a–c in the network. The origin server 12 maintains a media clip database and distributes the media clips to the proxy servers 14a–c. The origin server 12 also provides streaming services for client requests of segments that are not cached in any of the proxy servers 14a–c. The origin server 12 is responsible for handling media clip distribution and proxy cache misses. Each proxy server 14a–c is configured as a designated local proxy for a set of clients 20a–h and is responsible to provide streaming services to the clients 20a–h. Each proxy server 14a–c also supports remote clients on behalf of the designated proxies of the remote clients if the remote proxy servers do not cache the requested segments in their local caches. Each proxy server 14a–c maintains a local proxy server cache memory 16a–c. FIG. 1b illustrates a representative media clip 100 which is stored at the origin server 12. The media clip 100 is shown to be made up of a plurality of blocks 202a–i, where a block is defined as the smallest unit of disk space that can be read/written to independently. FIG. 1b also shows three client requests (i.e., streams S1, S2 and S3), for the media clip 100. The inventive caching method assumes that all streams start from the beginning of the media clip 100 and proceed to the end. That is, the inventive caching method does not consider VCR operations and accesses with random starting and ending points in a clip.

When a proxy server 14a–c receives a client request for a media clip, the proxy server 14a–c determines whether the request can be serviced locally at the proxy server 14a–c. If so, the proxy server 14a–c simply returns the requested block of the media clip 100 to the client 20a–i from the proxy server's cache memory 16c to conserve bandwidth. Otherwise, the proxy server 14a–c must retrieve the requested block of the media clip 100 from the origin server 12. In the case where the requested block is retrieved from the origin server 12, the proxy server 14a–c may decide to cache the requested block before delivering it to the requesting client.

FIG. 1b further illustrates a snapshot view of the position of three streams (i.e., S1, S2 and S3) requesting different blocks of media clip 100. Specifically, the pointer associated with stream S1 is shown positioned at block 202e subsequent to having received blocks 202a–202d. Similarly, stream S2 is shown positioned at block 202f subsequent to having received blocks 202a–202e, and stream S3 is shown positioned at block 202g subsequent to having received blocks 202a–202f.

FIG. 1c further illustrates three service intervals defined by the respective streams, S1, S2 and S3. Each interval is defined herein by a leader stream and a follower stream. For example, service interval 1 is defined by leader stream S2 and follower stream S1. In addition, each service interval has an associated interval length which defines a time difference between the position of the leader stream and the follower stream.

Figure 2A:
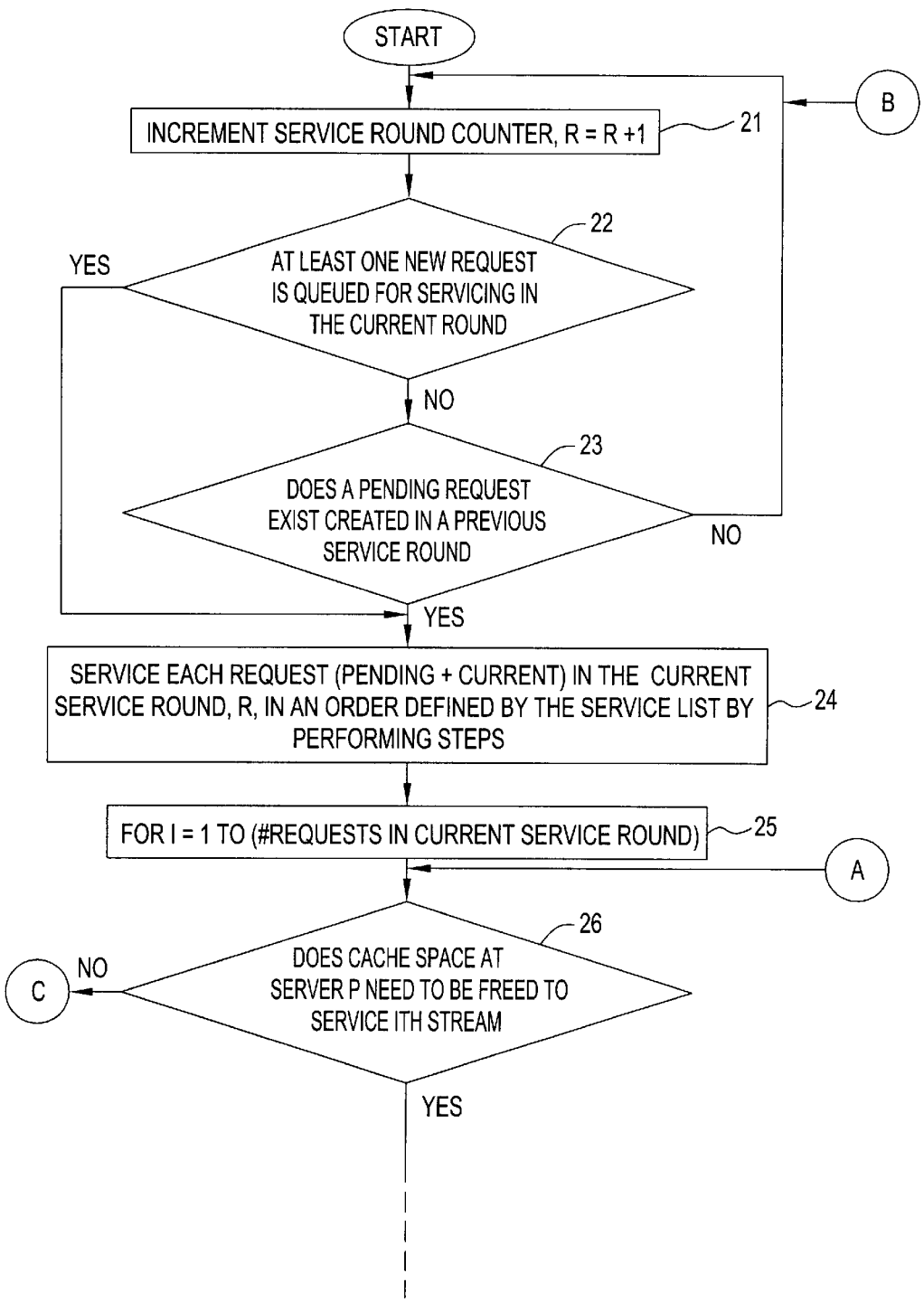
FIGS. 2A and 2B collectively depict a flow chart for illustrating the method of the present invention.
Figure 2B:
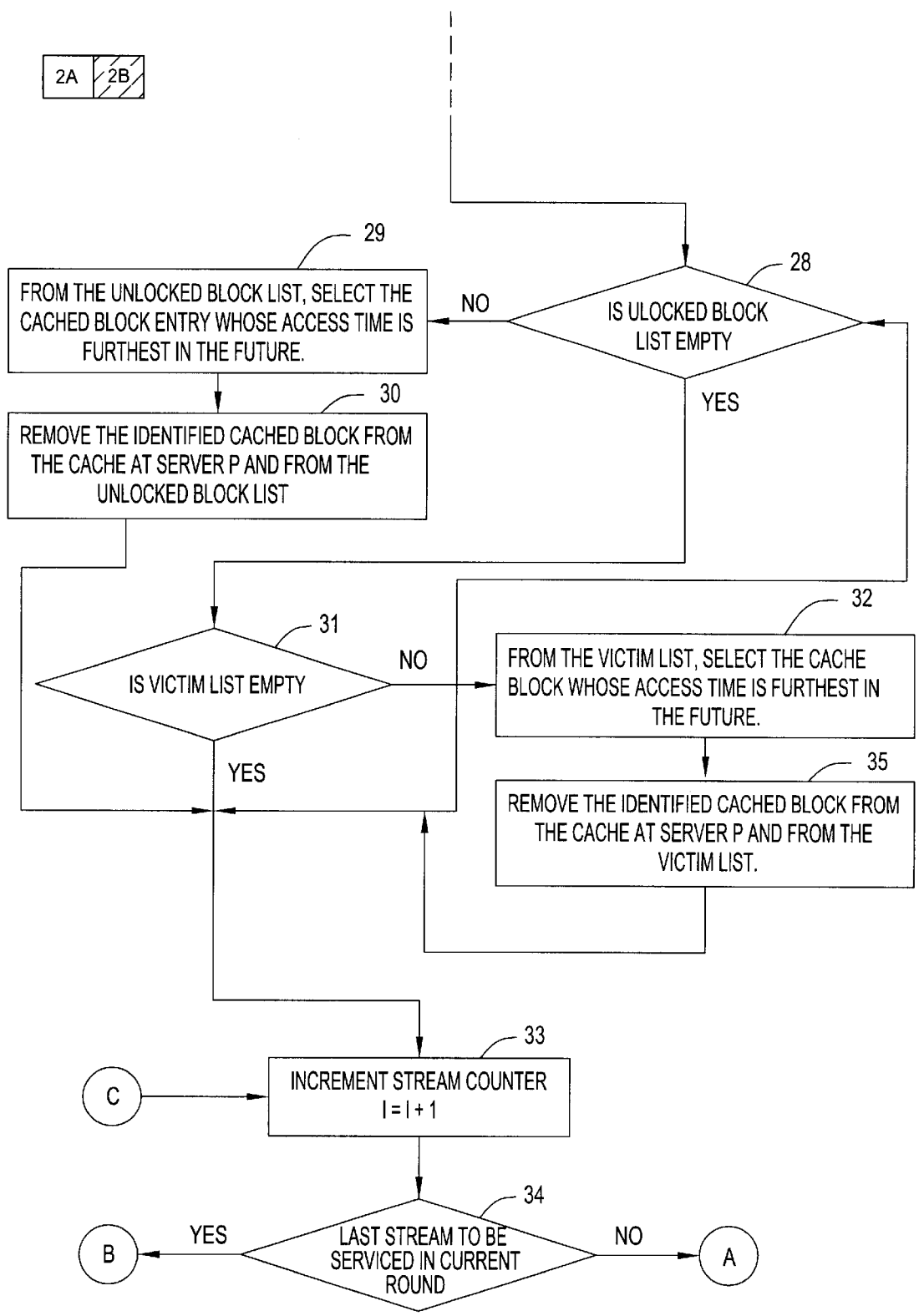

Refer now to FIG. 2, which is a flow chart illustrating one embodiment of the method for cache replacement for multimedia streams, according to the principles of the present invention. At step 21, a service round counter is incremented. As discussed above, the method for cache replacement for multimedia streams operates in consecutive rounds. At step 22, it is determined whether at least one new client request (stream) arrives at some point in time prior to the start of the current service round. In accordance with the method of the invention, client requests (i.e., streams) which arrive prior to the start of a service round are queued to be serviced in that round. If at least one new request is queued to be serviced in the round, the process continues at step 24. Otherwise, the process continues at determination step 23 where it is determined whether a pending request exists from a previous round which also requires service in the present round. If so, the process continues at step 24, otherwise it is determined that there are no requests to be serviced in the present round and processing returns to step 21 to proceed to the next round. At step 24, where there exists one or more requests to be serviced in the current round, each pending request will be serviced in an order defined by the service list. As stated above, the service list is reconstructed in each round by identifying all existing intervals in the current round, sorting the identified intervals by length in decreasing order, and then selecting the service leader from each interval in the sorted list for inclusion in the list. The list is then filled out by selecting the interval followers from the sorted list in the same manner. At step 25, a loop counter is started to service each request in the current round. At step 26, it is determined whether cache space must be freed to service the ith request (stream) in the current round. If cache space need not be freed, the process continues at step 33 where the stream counter is incremented. At step 34, it is determined whether the last request (stream) has been serviced in the current round. If there are additional requests (streams) to be serviced the process continues at step 25 to service the next request, otherwise if there are no additional requests in the round, the process continues at step 21 where the service round counter is incremented. In the case where it is determined at step 26 that cache space must be freed, the process continues at step 28 where it is determined whether the unlocked block list is empty. If the unlocked block list has at least one entry, a block will be selected from the list for removal from the cache at step 29. At step 29, a list entry (i.e., cache block) is identified from the victim list whose access time is furthest in the future. The identified block is removed from both the cache and the unlocked block list at step 30. As previously discussed, the unlocked block list includes only cached blocks for which there are no foreseeable future requests from existing streams. In other words, it includes those blocks which have already been delivered to clients in a previous service round and will therefore not be delivered to existing clients in the present or future rounds.

If it is determined that the unlocked block list is empty at step 28, the process continues at determination step 31 where it is determined whether the victim list is empty. As previously discussed, the victim list includes only cached blocks from the largest service interval having the furthest future access time. If it is determined at step 31 that the victim list is non-empty, the process continues at step 32 where an entry is identified from the list whose access time is furthest in the future. At step 35, the identified victim list entry is removed from the cache and from the victim list. If it is determined that the victim list is empty at step 31, the process continues at step 33 where the stream counter is incremented to service the next stream in the currrent round.

ILLUSTRATIVE EXAMPLE

An example is provided to illustrate how three representative clients requests the constituent blocks which make up media clip 100. FIGS. 1 and 2–7 illustrate media clip 100 and three representative streams (i.e., S1, S2 and S3). The example assumes that streams S1–S3 (e.g., clients 20f, 20g, 20h) each request media clip 100 via proxy server 14c. It is further assumed that the proxy server 14c has an associated proxy server cache memory 16c with a cache size of 3 blocks for simplicity. The proxy server cache memory 16c is assumed to be empty prior to the start of the example. As stated above, the inventive caching method operates in successive rounds. Five representative rounds will be described in the example below.

FIGS. 3C, 4D, 5C, 6E, and 7E are tables which further illustrate, for each of the respective five rounds, the various parameters and lists maintained by the inventive caching method.

Round 1

Referring now to FIGS. 3A–C, in the illustrative example, stream S1 is assumed to have arrived at some point in time prior to the start of the first round (See row 1 of FIG. 3c). In accordance with the method of the invention, client requests (i.e., streams) which arrive prior to the start of a round are queued to be serviced in that round.

The method of the invention assumes that all client requests (i.e., streams) are for the entire media clip 100 (i.e., from start to end). Each request or stream can be considered as a plurality of individual requests for each block of the media clip 100. That is, when a client request (i.e., stream) arrives at the proxy server 14c, it can be considered as a plurality of requests where each request is for one block of the media clip 100 requiring a different service time. That is, one block of the media clip will be delivered to the requesting client 20f in each round. With the next block of the clip being delivered in the next round.

In the example, upon receiving request S1 at the proxy server 14c, in the first round, a first block 202a of the media clip 100 will delivered to the client 20f. In the second round, the next block of the media clip 100, block 202b, will be delivered to the client, and so on. To service stream S1 in the first round, the proxy server 14c first determines whether block 202a is currently stored in the proxy server cache memory 16c. If the block is stored locally, stream S1 is serviced directly from the proxy server cache memory 16c thereby conserving bandwidth. Otherwise, the block must be retrieved from the origin server 12.

In the example, the proxy server cache memory 16c is assumed to be empty prior to the first round. Therefore, the proxy server 14c must retrieve block 202a from the origin server 12 to service client 20f (i.e., as represented by stream S1) in the first round. Upon obtaining block 202a from the origin server 12 and delivering it to stream S1, the proxy server 14c determines if there is space available in the proxy server cache memory 16c to cache block 202a. If there is available space in the cache 16c, block 202a will be cached at the proxy server (See row 3 of FIG. 3c).

Referring to the table of FIG. 3C, the inventive caching method maintains three lists including a service list 22, a victim list 24 and an unlocked list 26. The service list 22 determines the order in which streams are serviced in each round. The unlocked list 26 and victim list 24 includes those cached blocks which are to be replaced from the proxy server cache memory 16c when the proxy server 14c determines that cache space must be freed. The unlocked list 26 includes only cached blocks for which there are no foreseeable future requests from existing streams. The victim list 24 includes only cached blocks from the largest service interval having the furthest future access time.

In the first round of the example, upon receiving stream S1, service interval (S1-X) is created. Interval S1-X is considered an interval of infinite length because it includes a defined interval leader S1 without a defined interval follower, X.

FIGS. 3A and 3B illustrate the position of the interval leader S1 pointer at the start and end of the first round in relation to media clip 100. The S1 interval pointer is incremented at the end of round 1 to reflect the delivery of block 202a to the client 20f (stream S1).

In the first round, (See rows 1 and 2 of FIG. 3C), the victim list 24 is empty. In general, in each round, a cached block is included in the victim list 24 if the cached block is determined to be the last block of the longest service interval in that round. In the example, in round 1, interval S1-X is the only service interval in this round. Service interval (S1-X) is atypical in that is does not have an identifiable interval follower, i.e., "last block". As such, there is no identifiable candidate from the interval for inclusion in the victim list.

In the first round, the unlocked block list is empty at the beginning of round 1 (See row 2 of FIG. 3C) and includes block 202a at the end round 1 (See row 3 of FIG. 3C). In accordance with the method of the invention, a block is determined to be unlocked if there are no foreseeable future requests for that block in a future round by an existing stream in the present round. In the example, block 202a becomes unlocked at the end of round 1 after it is delivered to stream S1. As shown, there are no foreseeable future requests (i.e., streams) requesting block 202a in the present round, i.e., round 1. Therefore block 202a is considered unlocked until such time as a new stream arrives.

Round 2

Figure 4A:
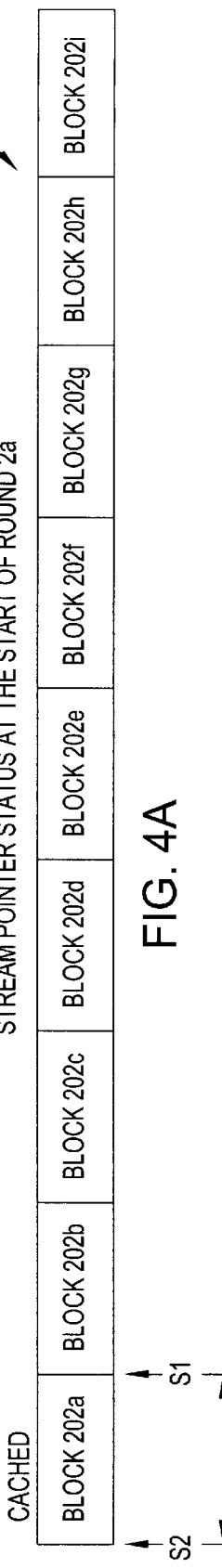
Figure 4B:
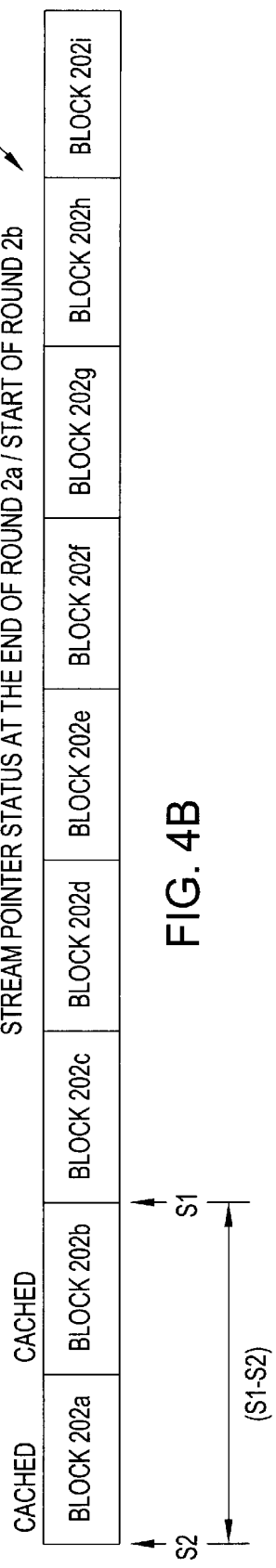

Prior to the start of the second round, client request (stream S2) for media clip 100 arrives at the proxy server 14c from client 20g. Referring to FIG. 4A, a new interval S1-S2 is formed upon the arrival of stream S2. The new service interval, S1-S2, is defined by leader stream S1 and follower stream S2 and has a defined interval length of 1 at the start of round 2a. the interval length of service interval (S1-S2) is increased to 2 at the end of round 2a, as shown in FIG. 4B. The change in interval length is a result of servicing stream S1 in round 2a by delivering block 202b to client 20f.

As discussed above, the service list 22 defines the order in which streams are serviced in each round. In the example, in the present round, the service list is (S1, S2). The service list 22 is constructed in each round by first identifying all existing intervals in the round, sorting the identified intervals by length in decreasing order, and then selecting the service leader from each interval in the sorted list. The list is then filled out by selecting the interval followers from the sorted list in the same manner. This process is best illustrated by example in future rounds of the example. In the present round, round 2, only the single service interval (S1-S2) exists. As such, the service list 22 is simply constructed without the need to sort multiple service intervals by first selecting the interval leader, S1, for inclusion in the service list and completing the service list by selecting the corresponding interval follower, S2. Service list (S1, S2) defines the order in which the streams are serviced in this round. That is, stream S1 will be serviced first in round 2a followed by the servicing of stream S2.

Round 2a

Referring now to FIGS. 4A and 4B, and rows 5 and 6 of the table of FIG. 4D, in round 2a, stream S1 is serviced first as determined by the service list 22 order. In servicing stream S1, the proxy server 14c services stream S1 by delivering block 202b. To service stream S1, the proxy server 14c first attempts to service stream S1 from the proxy server cache memory 16c. However, upon determining that block 202b is not currently cached in the proxy server cache memory 16c, the proxy server 14c retrieves block 202b from the origin server 12. Upon retrieving block 202b from the origin server 12, the proxy server 14c determines that there is sufficient cache space available to cache block 202b and caches the block at the end of round 2a (See row 6 of FIG. 4D).

At the start of round 2a (See row 5 of FIG. 4D), the victim list 24 contains block 202a, where block 202a represents the block of the largest identified interval S1-S2 that will be accessed furthest in the future (i.e., the last block of the interval). Upon servicing stream S1 in round 2a, the interval length changes from 1 block to 2 blocks, as illustrated in FIGS. 4A and 4B. Accordingly, the victim list 24 must be updated to reflect this change. The victim list 24 at the end of round 2a (row 6) contains block 202b, the last block in interval S1-S2.

The unlocked block list is empty in the second round because each cached block has a foreseeable future request associated with the block. Specifically, blocks 202a and 202b will be requested in the future by stream S2.

Round 2b

Figure 4C:
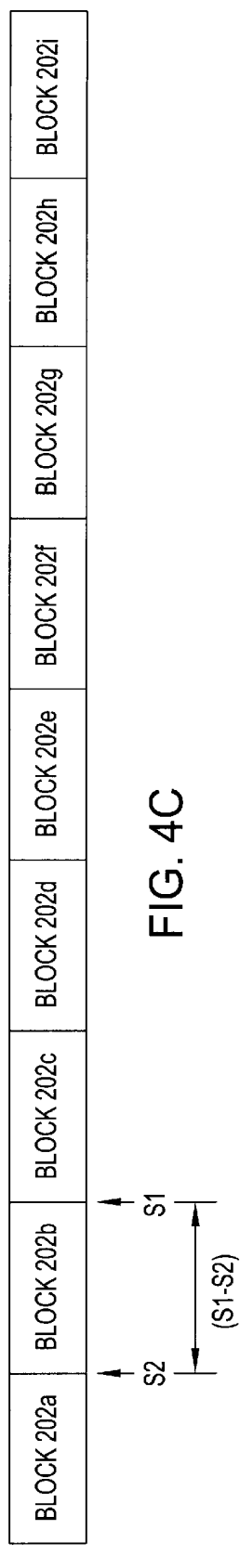
Figure 5A:
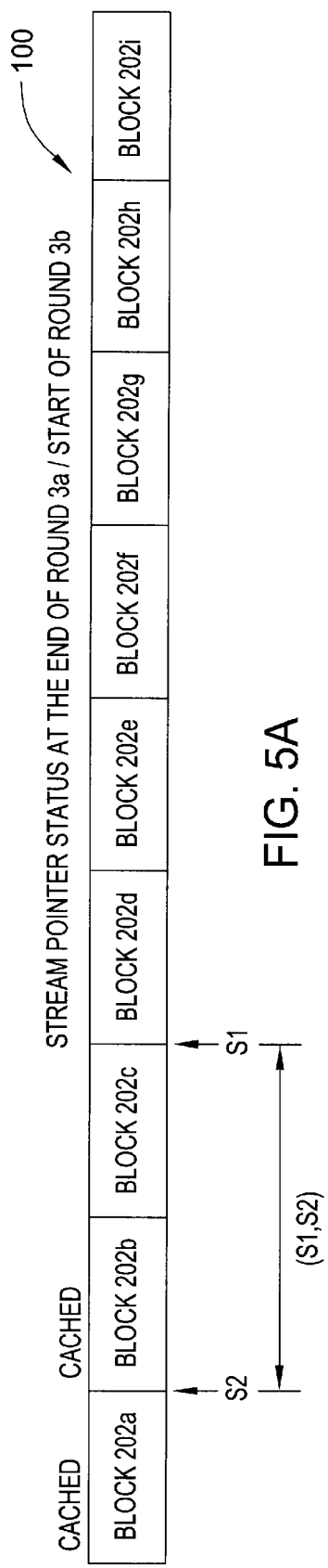
Figure 5B:
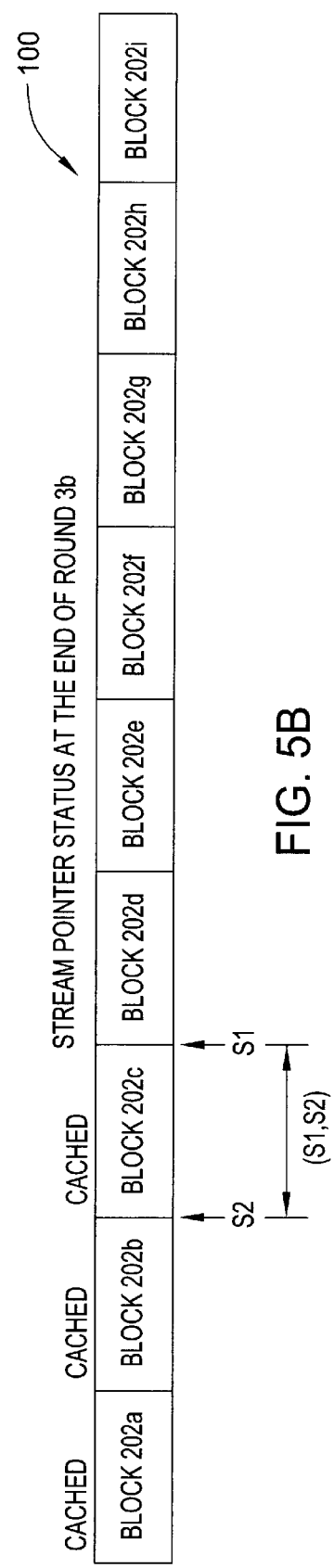

Stream S2 is serviced in round 2b. FIGS. 4B and 4C illustrate stream S2 at the start and end of round 2b. In this round, the proxy server 14c services stream S2 by delivering block 202a. To service stream S2, the proxy server 14c first attempts to service stream S2 from the proxy server cache memory 16c. In this case, the proxy server 14c finds block 202a in the proxy server cache memory 16c and services stream S2 directly from the cache.

In round 2b, the victim list 24 remains unchanged. The unlocked block list is changed, however, as a consequence of servicing request S2. FIGS. 4B and 4C. illustrate that subsequent to servicing stream S2 the S2 pointer is updated leaving block 202a without a foreseeable future request. Accordingly, block 202a is entered onto the unlocked block list (See row 8 of FIG. 4D).

Round 3

In the present example, no additional streams arrive prior to the start of this round. As such, no new intervals are formed in this round. Accordingly, the service list 22 does not change.

Round 3a

In round 3a, stream S1 is serviced, i.e., receives block 202c, which was not previously cached at the proxy server cache memory 16c and must therefore be retrieved from the origin server 12. Upon retrieving block 202c from the origin server 12, the proxy server 14c caches block 202c at the third position of the proxy server cache memory 16c and returns block 202c to stream S1. The state of the proxy server cache memory 16c at the end of round 3a is now {202a/202b/202c}.

At the start of round 3a, the victim list 24 contains block 202b, as being the block having the furthest access time. Upon servicing stream S1, block 202c now becomes the block having the furthest access time in the longest interval. As such, block 202c is substituted for block 202b in the victim list.

Round 4

Figure 6A:
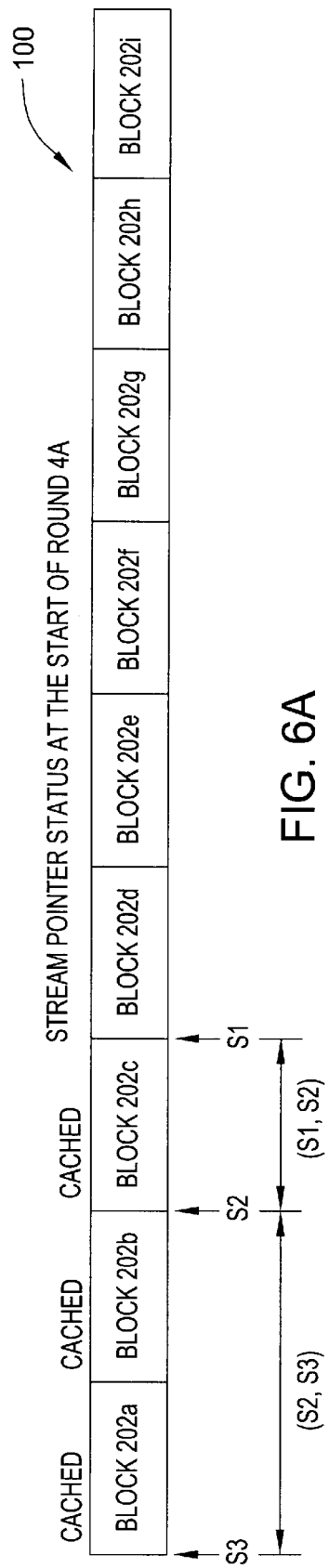

Referring now to FIG. 6A, prior to the start of the fourth round, a third client request, stream S3, for the media clip arrives at the proxy server 14c. A new interval (S2-S3) is formed upon the arrival of stream S3 which is defined by leader stream S2 and follower stream S3.

Round 4a

Figure 6B:
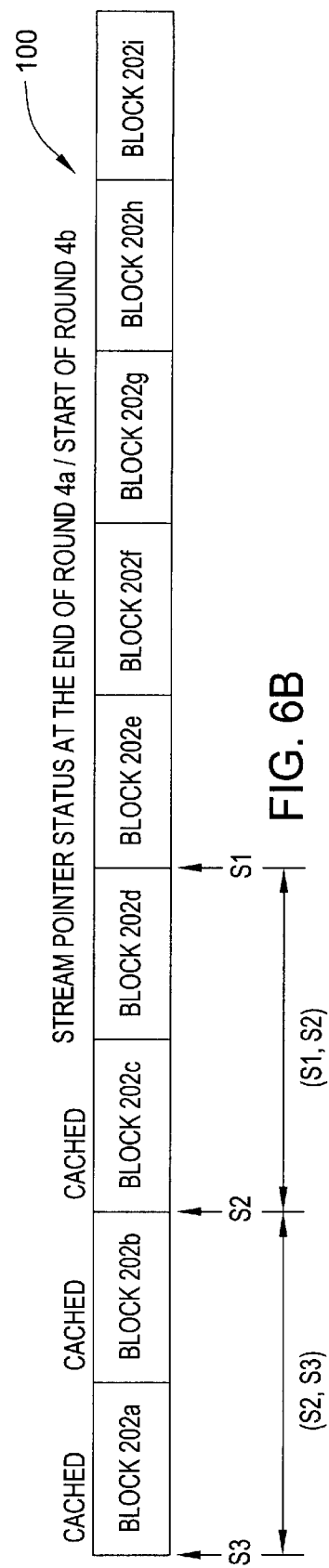

Referring now to FIGS. 6A and 6B, and rows 14 and 15 of the table of FIG. 6E, in round 4a, stream S1 is serviced first as required by the service list order. In servicing S1, the proxy server 14c determines that block 202d is not locally cached and must therefore be retrieved from the origin server 12. Upon retrieving block 202d from the origin server 12, the proxy server 14c attempts to cache block 202d at the proxy server cache memory 16c. At this point, the proxy server cache memory 16c is full and a block must be selected for removal from the proxy server cache memory 16c to make room for block 202d. The block to be removed is determined by first referring to the unlocked list, which at this point is empty. Next, reference is made to the victim list 24 which at this point contains block 202b. As such, block 202b will be removed from the proxy server cache memory 16c and replaced with block 202d. It is noted that block 202b will be removed from the victim list 24.

At the end of round 4a, (See row 15 of FIG. 6E), the victim list 24 is updated to reflect the change in the cache contents. Specifically, the victim list 24 now contains block 202d. Block 202d is selected for entry in the victim list 24 by first determining the longest service interval in the fourth round. In this round, service intervals (S1-S2) and (S2-S3) are of equal length, i.e., 2. As such, both service intervals are candidates for determining a block to be included in the victim list. Block 202b is the victim list candidate from service interval (S2-S3) and block 202d is the victim list candidate from service interval (S1-S2). Block 202d is selected for inclusion in the victim list over block 202b because its access time is further in the future than block 202b.

The unlocked block list 26 is empty as each block in the media clip 100 has an associated future request, as shown in FIGS. 6A and 6B.

Round 4b

Referring now to FIGS. 6B and 6C, and rows 16 and 17 of the table of FIG. 6E, in round 4b, stream S2 is serviced in round 4b in accordance with the service list. FIGS. 6B and 6C illustrate the S2 stream pointer at the start and end of round 4b. In this round the proxy server 14c services stream S2 by delivering block 202c. To service stream S2, the proxy server 14c first attempts to service stream S2 from the proxy server cache memory 16c. In this case, the proxy server 14c finds block 202c in the proxy server cache memory 16c and services stream S2 directly from the proxy server cache memory 16c.

In round 4b, the victim list 24 is changed. At the end of round 4b, (See row 17 of FIG. 6E), the victim list 24 contains block 202c. Block 202c is selected for entry in the victim list 24 by first determining the longest service interval at the end of round 4b. Service interval (S1-S2) is of length 1 and interval (S2-S3) is of length 3. As such, interval (S2-S3) is determined to be the longest service interval. The cached block whose access time is furthest in the future in interval (S2-S3) is block 202c.

The unlocked block list 26 remains unchanged as there are no blocks at this point without a foreseeable future request.

Round 4c

Referring now to FIGS. 6C and 6D, and rows 18 and 19 of the table of FIG. 6E, in round 4c, stream S3 is serviced in accordance with the service list order. FIGS. 6C and 6D illustrate the S3 stream pointer at the start and end of round 4c. In this round, the proxy server 14c services stream S3 by delivering block 202a. To service stream S3, the proxy server 14c first attempts to service stream S3 from the proxy server cache memory 16c. In this case, the proxy server 14c finds block 202a in the proxy server cache memory 16c and services stream S3 directly from the cache.

At the end of round 4c, (See row 19 of FIG. 6E), the victim list 24 is unchanged. Although there is a change in service interval (S2-S3), it still represents the longest identifiable service interval for the purpose of selecting a victim list entry. As such, block 202c remains the block from this interval whose access time is furthest in the future.

The unlocked block list 26 is changed, however, as a consequence of stream S3 receiving service in this round. As such, block 202a of media clip 100 has no foreseeable future request and is therefore included as an unlocked block list entry.

Round 5

In the present example, no additional streams arrive prior to the start of this round. As such, no new intervals are formed in this round. Accordingly, the service list 22 does not change.

Round 5a

Figure 7A:
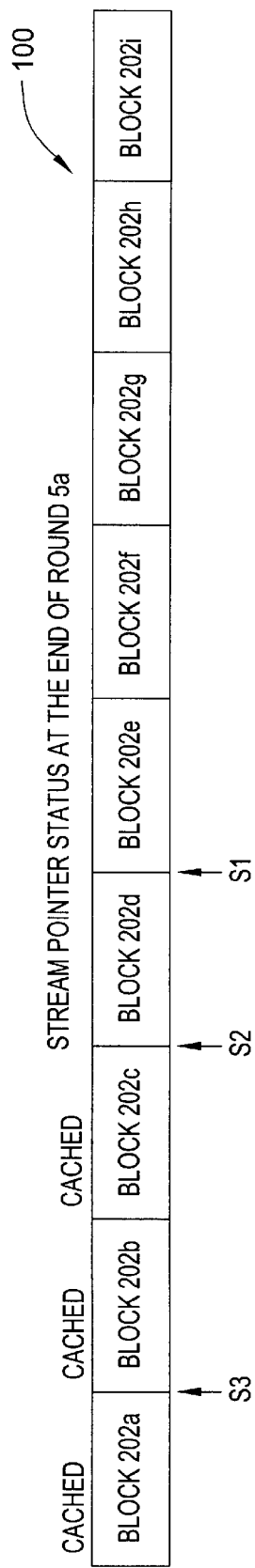
Figure 7B:
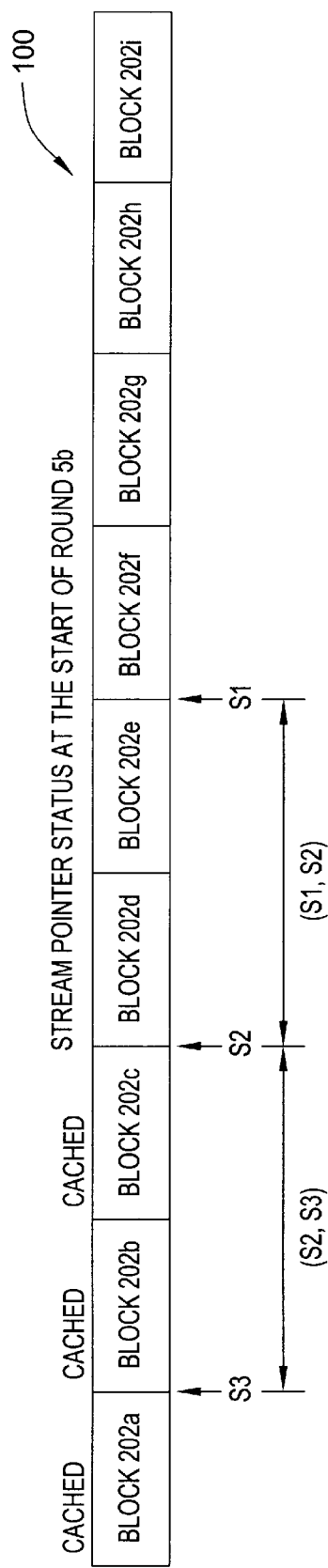

Referring now to FIGS. 7A and 7B, and rows 21 and 22 of the table of FIG. 7E, in round 5a, stream S1 is serviced first as defined by the service list order. In servicing stream S1, the proxy server 14c determines that block 202e is not locally cached and must therefore be retrieved from the origin server 12. Upon retrieving block 202e from the origin server 12, the proxy server 14c attempts to cache block 202e at the proxy server cache memory 16c. In this case, the proxy server cache memory 16c is full and a block must be removed from the cache 16c to make room to cache block 202e. The block to be removed from the cache is made by first referring to the unlocked list 26 to determine if there are any list entries. If no list entries exist, the victim list 24 is referenced to determine if there are any list entrie. In the example, the unlocked block list 26 contains an entry, which is block 202a. Block 202a is removed from the proxy server cache memory 16c to free space to store block 202e. The change in the cache contents are shown at rows 20 and 21 of FIG. 7E.

At the end of round 5a (See row 21 of FIG. 7E), the victim list 24 contains block 202c and block 202e. In the fifth round, both intervals (S1-S2) and (S2-S3) are of equal length (i.e., 2 blocks). As such, both intervals are candidates for selecting a block to be included in the victim list 24. As discussed, the victim list 24 chooses the cached block in the longest interval whose access time is furthest in the future. In this case, block 202e is selected from interval (S2-S3) and block 202c is selected from interval (S1-S2).

The unlocked block list is empty because there are no unlocked blocks which are currently cached. That is, only block 202a is unlocked at the end of round 5a.

Round 5b

Figure 7C:
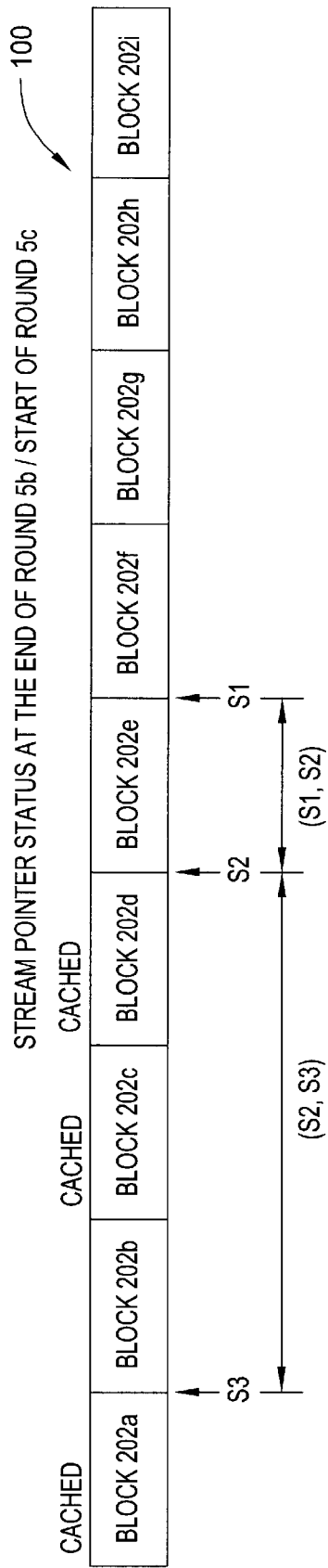

Referring now to FIGS. 7B and 7C, and rows 22 and 23 of the table of FIG. 7E, in round 5b, stream S2 is serviced first as defined by the service list order. Stream S2 is serviced in round 5b in accordance with the service list. FIGS. 7B and 7C illustrate the S2 stream pointer at the start and end of round 5b. In this round, the proxy server 14c services stream S2 by delivering block 202d. To service stream S2 the proxy server 14c attempts to service stream S2 from the proxy server cache memory 16c. In this case, the proxy server 14c finds block 202d in the proxy server cache 16c and services stream S2 directly from the proxy server cache memory 16c.

In round 5b, the victim list 24 is changed. At the end of round 5b (row 23 of FIG. 7E), the victim list 24 now contains block 202d. Block 202d is selected for entry in the victim list 24 by first determining the longest interval at the end of round 4b. At the end of round 5b interval (S1-S2) has a length of 1 and interval (S2-S3) has a length of 3. As such, interval (S2-S3) is determined to be the longest interval. The blocks which comprise service interval (S2-S3) are then analyzed to determine whether one or more blocks of the interval are currently being cached. If so, the victim list candidate is selected as the cached block whose access time in the interval is furthest in the future (i.e., block 202d).

The unlocked block list 26 remains unchanged from the previous round, i.e., the list 26 contains blocks 202a and 202b.

Round 5c

Figure 7D:
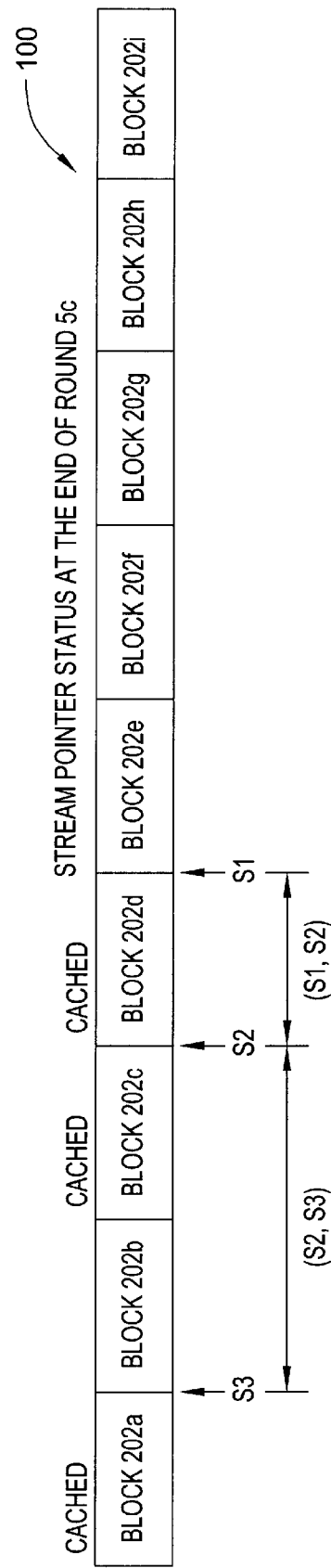

Referring now to FIGS. 7C and 7D, and rows 24 and 25 of the table of FIG. 7e, in round 5c, stream S3 is serviced in accordance with the service list. In this round the proxy server 14c services stream S3 by delivering block 202b. To service stream S3, the proxy server 14c first attempts to service stream S3 from the proxy server cache memory 16c. However, upon determining that block 202b is not currently cached in the proxy server cache memory 16c, the proxy server 14c must retrieve block 202b from the origin server 12. Upon retrieving block 202b from the origin server 12, the proxy server 14c determines whether there is sufficient cache space available to cache block 202b.

At the end of round 5c (See row 25 of FIG. 7E), the victim list 24 is unchanged. This occurs despite the change in length of interval S2-S3 as it still represents the longest interval (i.e., block size is 2) with block 202d representing the block whose access time is furthest in the future. The unlocked block list 26 remains unchanged.

It will be understood that the steps of method discussed can be performed by an appropriate processor executing instructions stored in storage. It will also be understood that the invention is not limited to any particular implementation or programming technique and that the invention may be implemented using any appropriate techniques for implementing the functionality described herein. The invention is not limited to any particular programming language or operating system.

It will be understood that various modifications may be made to the embodiments disclosed herein, and that the above descriptions should not be construed as limiting, but merely as exemplifications of preferred embodiments. Those skilled in the art will envision other modifications within the scope and spirit of the claims appended hereto.

What is claimed is:

1. A cache replacement method for a cache configured as a plurality of cache blocks, wherein said cache replacement method operates in successive rounds, the method comprising the steps of:

in each round:
constructing service intervals from client requests for a media clip, said client requests being received in a present round and/or previous rounds;
constructing a service list from said constructed service intervals; and
servicing said client requests for said media clip in an order defined by said service list.

2. The cache replacement method of claim 1, wherein the servicing step further comprises the step of returning an ith block of said media clip in an ith round, where $1<i<L$, where L is the number of blocks of the media clip.

3. The cache replacement method of claim 1, wherein the servicing step further comprises the steps of:
determining whether a requested block of said media clip is stored at a proxy server;
retrieving said block of said media clip from said proxy server and delivering said retrieved block to a client in response to said client request if it is determined that said block is stored at said proxy server; and
retrieving said requested block of said media clip from an origin server and delivering said retrieved block to a client in response to said client request if it is determined that said block is not stored at said proxy server.

4. The cache replacement method of claim 3, wherein the servicing step further comprises the steps of:
storing said retrieved block of said media clip in a cache associated with said proxy server if it is determined that there is available memory in said cache to store said retrieved block; and replacing a block stored in said proxy server cache memory with said retrieved block if it is determined that there is not enough memory in said cache to store said retrieved block.

5. The cache replacement method of claim 4, wherein the replacing step further comprises the steps of:

selecting a block from a first list to be replaced from said cache memory if it is determined that said first list contains at least one entry; and selecting a block from a second list to be replaced from said cache memory if it is determined that said second list does not contain at least one entry and that said second list contains at least one entry.

6. The cache replacement method of claim 1, wherein the step of constructing a service list further comprises the steps of:

sorting said constructed service intervals according to a service interval length, wherein each service interval is comprised of a service interval leader and a service interval follower;

selecting the service interval leader from each entry in the sorted list to be included in said service list; and selecting the service interval follower from each entry in the sorted list to be included in said service list.

7. The cache replacement method of claim 1, further comprising the step of determining whether at least one block cached in a proxy server cache can be selected for inclusion in an unlocked blocked list.

8. The cache replacement method of claim 7, wherein the determining step further comprises the step of including said at least one cached block in said unlocked block list if it is determined that there are no client requests for said cached block in a present or future round.

9. The cache replacement method of claim 1, further comprising the step of determining whether at least one block cached in a proxy server cache can be selected for inclusion in a victim list.

10. The cache replacement method of claim 9, wherein the determining step further comprises the step of including said at least one cached block in said victim list if said cached block is a block belonging to a particular service interval and said at least one cached block is the block in said particular service interval that will be requested by at least one client furthest in the future.

11. The cache replacement method of claim 10, wherein said particular service interval is the largest service interval.

12. A cache replacement system for a cache configured as a plurality of cache blocks, wherein said cache replacement method operates in successive rounds, the system comprising:

means for constructing service intervals from client requests for a media clip, said client requests being received in a present round and/or previous rounds;

means for constructing a service list from said constructed service intervals; and means for servicing said client requests for said media clip in an order defined by said service list.

\* \* \* \* \*